US012714237B2

(12) United States Patent
Jewett et al.

(10) Patent No.: US 12,714,237 B2
(45) **Date of Patent: *Aug. 25, 2026**

(54) POCKETED SPRING ASSEMBLY HAVING DIMENSIONALLY STABILIZING SUBSTRATE

(71) Applicant: L&P Property Management Company, South Gate, CA (US)

(72) Inventors: Jason V. Jewett, Carthage, MO (US); Carsten Nyhues, Joplin, MO (US); Scott D. Reading, Avondale, AZ (US)

(73) Assignee: L&P Property Management Company, Carthage, MO (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/914,623

(22) Filed: Oct. 14, 2024

(65) Prior Publication Data

US 2025/0031862 A1 Jan. 30, 2025

Related U.S. Application Data

(63) Continuation of application No. 18/450,511, filed on Aug. 16, 2023, now Pat. No. 12,137,813, which is a (Continued)

(51) Int. Cl.

*A47C 27/045* (2006.01)
*A47C 7/18* (2006.01)

(Continued)

(52) U.S. Cl.

CPC ............ *A47C 27/0456* (2013.01); *A47C 7/18* (2013.01); *A47C 7/347* (2013.01); *A47C 7/35* (2013.01);

(Continued)

(58) Field of Classification Search

CPC ....... A47C 27/0456; A47C 7/18; A47C 7/347; A47C 7/35; A47C 27/05; A47C 27/062;

(Continued)

(56) References Cited

U.S. PATENT DOCUMENTS 1,955,583 A * 4/1934 Haffey .................. A47C 27/05 5/738
2,867,892 A * 1/1959 Houth .................. D06M 15/39 28/163

(Continued)

OTHER PUBLICATIONS

Patent Cooperation Treaty, International Searching Authority, International Search Report, mailed Dec. 2, 2024, 10 Pages.

*Primary Examiner* — Justin C Mikowski
*Assistant Examiner* — Luke Hall
(74) *Attorney, Agent, or Firm* — Wood, Herron & Evans LLP

(57) ABSTRACT

A pocketed spring assembly comprises a plurality of parallel strings of individually pocketed springs. A dimensionally stabilizing substrate is secured to at least some of the strings on one of the top and bottom surfaces of the strings. A scrim sheet is secured to at least some of the strings on an opposed surface of the strings to maintain the positions of the strings. The dimensionally stabilizing substrate is laterally rigid enough to maintain length and width dimensions of the coil spring assembly.

20 Claims, 11 Drawing Sheets

Related U.S. Application Data continuation of application No. 17/212,496, filed on Mar. 25, 2021, now Pat. No. 11,771,235, which is a continuation of application No. 15/987,185, filed on May 23, 2018, now Pat. No. 11,013,340.

(51) Int. Cl.

| | |
|---|---|
| ***A47C 7/34*** | (2006.01) |
| ***A47C 7/35*** | (2006.01) |
| ***A47C 27/05*** | (2006.01) |
| ***A47C 27/06*** | (2006.01) |
| ***A47C 27/07*** | (2006.01) |
| ***B68G 7/02*** | (2006.01) |
| ***B68G 9/00*** | (2006.01) |

(52) U.S. Cl.
CPC ............ *A47C 27/05* (2013.01); *A47C 27/062* (2013.01); *A47C 27/064* (2013.01); *A47C 27/07* (2013.01); *B68G 7/02* (2013.01); *B68G 9/00* (2013.01)

(58) Field of Classification Search
CPC ..... A47C 27/064; A47C 27/07; A47C 27/066; B68G 7/02; B68G 9/00
USPC .............................................................. 5/720
See application file for complete search history.

(56) References Cited

U.S. PATENT DOCUMENTS

| | | | | | |
|---|---|---|---|---|---|
| 3,083,381 | A * | 4/1963 | Bailey | A47C 27/088 | 219/217 |
| 3,099,021 | A * | 7/1963 | Wetzler | A47C 27/20 | 264/46.7 |
| 3,276,899 | A * | 10/1966 | Muhlberg | D21H 19/826 | 524/53 |
| 3,714,087 | A * | 1/1973 | Buchanan | C08L 21/00 | 524/36 |
| 5,459,892 | A * | 10/1995 | Wells | A47C 23/05 | 5/200.1 |
| 5,669,799 | A * | 9/1997 | Moseneder | A47C 7/18 | 297/452.48 |
| 5,891,937 | A * | 4/1999 | Berg | C08L 99/00 | 428/221 |
| 6,256,820 | B1 * | 7/2001 | Moser | A47C 27/064 | 5/721 |
| 6,272,706 | B1 * | 8/2001 | McCune | F16F 1/364 | 5/655.8 |
| 6,295,676 | B1 * | 10/2001 | Warner | A47C 27/064 | 5/717 |
| 6,372,076 | B1 * | 4/2002 | Ogle | B29C 44/06 | 156/308.2 |
| 6,398,199 | B1 * | 6/2002 | Barber | A47C 27/064 | 5/655.8 |
| 6,515,054 | B1 * | 2/2003 | Matsushita | C08L 67/04 | 524/167 |
| 7,125,460 | B2 * | 10/2006 | Ogle | D04H 1/43828 | 442/389 |
| 7,238,630 | B2 * | 7/2007 | Steagall | A47C 27/22 | 428/218 |
| 7,279,058 | B2 * | 10/2007 | Morgan | B32B 5/22 | 156/331.7 |
| 7,279,065 | B1 * | 10/2007 | Ogle | D06N 7/0089 | 156/324 |
| 7,407,558 | B2 * | 8/2008 | Kaylor | B32B 5/022 | 156/247 |
| 7,435,475 | B2 * | 10/2008 | Heilman | D04H 1/09 | 442/403 |
| 7,785,437 | B2 * | 8/2010 | Gilder | B32B 27/18 | 156/77 |
| 7,979,935 | B2 * | 7/2011 | Grothaus | A47C 27/064 | 5/717 |
| 8,262,634 | B1 * | 9/2012 | Gray | A61F 13/551 | 424/443 |
| 2002/0023964 | A1 * | 2/2002 | Okamura | G06K 19/07779 | 235/492 |
| 2002/0162173 | A1 * | 11/2002 | Formenti | A47C 27/148 | 5/718 |
| 2003/0143014 | A1 * | 7/2003 | Steinschaden | B43K 7/12 | 401/48 |
| 2004/0103479 | A1 * | 6/2004 | Mossbeck | A47C 27/062 | 5/655.8 |
| 2004/0128773 | A1 * | 7/2004 | Barber | F16F 1/08 | 5/716 |
| 2007/0204407 | A1 * | 9/2007 | Lee | A47C 27/063 | 5/717 |
| 2012/0091644 | A1 | 4/2012 | Ahn | | |
| 2015/0230621 | A1 * | 8/2015 | Spinks | A47C 31/00 | 5/698 |
| 2015/0359349 | A1 * | 12/2015 | Eigenmann | A47C 21/042 | 5/655.8 |
| 2016/0045034 | A1 * | 2/2016 | Häger | A47C 27/064 | 267/145 |
| 2016/0166076 | A1 * | 6/2016 | Mossbeck | A47C 27/066 | 297/452.5 |
| 2019/0269247 | A1 * | 9/2019 | Smith | A47C 27/06 | |
| 2019/0357694 | A1 | 11/2019 | Jewett et al. | | |
| 2021/0068553 | A1 | 3/2021 | Nygren | | |
| 2023/0270262 | A1 | 8/2023 | Jewett et al. | | |

* cited by examiner

| | MEASUREMENT 1 (in) | MEASUREMENT 2 (in) | AVERAGE |
|---|---|---|---|
| SUBSTRATE | 79.19 | 79.25 | 79.22 |
| STANDARD | 77.94 | 78.13 | 78.03 |
| | | DIFFERENCE | 1.19 |

| 1osy SCRIM | 4osy SUBSTRATE |
|---|---|
| 0.1025 oz | 39.949 oz |

| 1osy SCRIM | 4osy SUBSTRATE |
|---|---|
| 0.22 lb | 5.44 lb |

POCKETED SPRING ASSEMBLY HAVING DIMENSIONALLY STABILIZING SUBSTRATE

CROSS-REFERENCE TO RELATED APPLICATIONS

This application is a Continuation of U.S. patent application Ser. No. 18/450,511 Filed Aug. 16, 2023 (pending), which is a Continuation of U.S. patent application Ser. No. 17/212,496 Filed Mar. 25, 2021 (now U.S. Pat. No. 11,771, 235), which is a Continuation of U.S. patent application Ser. No. 15/987,185 filed May 23, 2018 (now U.S. Pat. No. 11,013,340), the disclosures of which are incorporated by reference herein in their entirety.

FIELD OF THE INVENTION

This invention relates generally to bedding and seating products and, more particularly, to pocketed spring assemblies used in bedding and seating products.

BACKGROUND OF THE INVENTION

Mattress spring core construction over the years has been a continuously improving art with advancements in materials and machine technology. A well-known form of spring core construction is known as a Marshall spring construction wherein metal coil springs are encapsulated in individual pockets of fabric and formed as elongate or continuous strings of individually pocketed coil springs. Due to the fabric used in pocketed spring assemblies being weldable to itself, these strings of pocketed springs are manufactured by folding an elongate piece of fabric in half lengthwise to form two plies of fabric and thermally or ultrasonically welding transverse and longitudinal seams to join the plies of fabric to define pockets within which the springs are enveloped. One such fabric is a non-woven polypropylene fabric.

Once strings of pocketed springs are constructed, they may be assembled to form a pocketed spring assembly for a mattress, cushion or the like by a variety of methods. For example, multiple or continuous strings may be arranged in a row pattern corresponding to the desired size and shape of a mattress or the like, and adjacent rows of strings may be interconnected by a variety of methods. The result is a unitary assembly of individually pocketed coil springs.

The pocketed spring assembly then must be shipped to a mattress or furniture manufacturer for further assembly. One method of shipping a plurality of pocketed spring assemblies is to roll pack them into a roll for shipping. Upon receipt, the mattress or furniture manufacturer unrolls the pocketed spring assemblies and secures cushioning layers to one or both the top and bottom of each pocketed spring assembly before covering the cushioned pocketed spring assembly to create a finished mattress or furniture cushion.

In order to assist a mattress or furniture manufacturer to handle one of the pocketed spring assemblies, top and bottom scrim sheets, made of non-woven polypropylene fabric, are secured to the top and bottom surfaces, respectively, of the pocketed spring assembly by the spring assembler before the spring assembler roll packs the pocketed spring assemblies for shipment to the mattress or furniture manufacturer. Therefore, the top and bottom scrim sheets must be bendable to allow the innerspring unit to be rolled up as is required in the packaging process ("roll packing") for shipment to the mattress manufacturer.

In the current environment in which finished mattresses commonly are ordered online, it is desirable for a finished mattress to be capable of being rolled up for shipment. It is increasingly common for a finished mattress to be compressed and rolled so that it may fit into a parcel carrier-friendly sized box and delivered directly to the consumer. Thus, a finished mattress must be able to bend in the Z axis direction.

The common non-woven polypropylene scrim sheets incorporated into a pocketed spring assembly today bend in the X and Y and Z axis directions, but lack the rigidity to maintain the sizing of the pocketed spring assembly in the X and Y (length and width) axis directions after such pocketed spring assemblies are unrolled. Common non-woven polypropylene scrim sheets incorporated into pocketed spring assemblies help with the manual handling of the pocketed spring assembly during manufacturing of the pocketed spring assembly. They also help the mattress manufacturer upholster the pocketed spring assembly into a finished mattress.

However, upon being unrolled, a pocketed spring assembly having conventional non-woven polypropylene scrim sheets is not always the correct size in the X and Y (length and width) axis directions needed by a mattress manufacturer to apply cushioning materials. Different pocketed spring assemblies coming out of the roll may be different sizes due to their different locations within a roll. The pocketed spring assemblies closer to the center of the roll are wound tighter than the pocketed spring assemblies around the outside of the roll. The unrolled pocketed spring assemblies may vary in size in the X and Y (length and width) axis directions and behave like an accordion due to the stretching nature of the non-woven polypropylene scrim sheets connecting the pockets together. After being shipped to a mattress manufacturer after being in a rolled state for some time, the dimensions of the pocketed spring assembly may have changed over time, which is undesirable for a mattress manufacturer.

Today it's necessary for a mattress manufacturer to apply a sheet of polyurethane foam (referred to as "base foam") to the bottom of the pocketed coil spring assembly to create the necessary rigidity described above. A laborer must spray either water-based or hot-melt adhesive on the surface of the pocketed spring assembly and/or the polyurethane foam while the bottom of what will eventually become the mattress is facing upward. The foam is then applied, and the laborer must push or pull the pocketed spring assembly to the dimensions of the foam. This "sizes" the pocketed spring assembly to the precise dimension necessary such as 60"×80" for a typical United States "queen" size as defined the International Sleep Products Association (ISPA). This process is difficult as the laborer must balance the time needed to achieve an aesthetically pleasing result with the "tack" time of the adhesive. If the laborer spends too much time trying to wrestle the pocketed spring assembly into place the adhesive will set up/cure and a poor bond will result, causing lost time as the process must then restart from the beginning. Now, since it was necessary to turn the bottom of the pocketed spring assembly upward to apply the base foam, the operator must now flip the pocketed spring assembly top side up so that the remainder of the mattress upholstery layer can be applied.

Pocketed spring assemblies can weigh as much as 100 pounds, so this task is challenging from an ergonomic perspective and creates the potential for an injury to the laborer. In some cases, it may even be necessary for the mattress manufacturer to purchase and install expensive pneumatic devices to assist in the flipping of the pocketed spring assembly to avoid harm to the laborer.

The present invention solves these problems as a dimensionally stabilizing substrate is applied directly to the pocketed spring assembly at the time the pocketed spring assembly is manufactured. Thus, there's no need for the flipping of the mattress nor the time spent to apply adhesive for the base layer or time spent positioning the pocketed spring assembly to the dimensions of the base layer.

The method described above is a traditional and common method of upholstering an innerspring unit into a mattress. While this is widely practiced, there's a current trend toward utilizing a roll coating machine to assemble the mattress. A roll coating machine allows an operator to pass the pocketed spring assembly into an opening where the adhesive for the foam layers is applied evenly across the surface by a roller which is covered in water-based adhesive. After the pocketed spring assembly exits the opposite side of the roll coating machine a layer of foam is laid onto the surface of the pocketed spring assembly coated with adhesive. This method provides an even coat of adhesive to create a substantial bond. However, the pocketed spring assembly that is fed into the roll coating machine must be of a precise dimension in the length and width directions. This creates a challenge because, as mentioned herein, the pocketed spring assembly may not be stable in the length and width direction due to being roll packed.

Therefore, there is a need for a pocketed spring assembly which is rigid in the X and Y axis directions, but bendable in the Z axis direction for roll packing for shipment to a mattress manufacturer.

There remains a need to provide a pocketed spring assembly to a mattress manufacturer which does not have a base layer of foam.

There remains a need to provide a pocketed spring assembly to a mattress manufacturer which provides a more cost effect replacement for a base layer of foam.

SUMMARY OF THE INVENTION

In one aspect, a bedding or seating product comprises a pocketed spring assembly. The pocketed spring assembly comprising a plurality of parallel strings of springs joined together to form a pocketed spring assembly core. Each string is joined to at least one adjacent string. The strings of springs may extend longitudinally or transversely. Each string comprises a plurality of individually pocketed springs. Each string comprises a piece of fabric comprising first and second opposed plies of fabric on opposite sides of the springs and joined together along a longitudinal seam. A plurality of pockets is formed along the length of the string by transverse or separating seams joining the first and second plies, and at least one spring being positioned in each pocket.

A dimensionally stabilizing substrate is secured to one of top and bottom surfaces of at least some of the strings of the pocketed spring assembly core to create a pocketed core assembly. The dimensionally stabilizing substrate is laterally rigid enough to eliminate length and width elasticity of the coil spring assembly, yet remain flexible in the direction of a height of the pocketed spring assembly to allow the pocketed spring assembly to be roll packed. In one embodiment, the dimensionally stabilizing substrate is made from a continuous filament, needled polyester with a resin binder having a weight of at least two ounces per square yard.

Cushioning materials may be placed on one or both sides of the pocketed spring assembly, and an upholstered covering may encase the pocketed spring assembly and cushioning materials.

A flexible scrim sheet may be secured to at least some of the strings on a surface of the pocketed spring assembly core opposite the dimensionally stabilizing substrate. The flexible scrim sheet may be made of any material flexible in the X, Y and Z axis directions. The flexible scrim sheet may be made of non-woven polypropylene fabric or any other known materials. The dimensionally stabilizing substrate is thicker and more rigid than the scrim sheet. In some cases, the dimensionally stabilizing substrate is at least twice the thickness of the scrim sheet.

In another aspect, a pocketed spring assembly for a bedding or seating product comprises a pocketed spring assembly core, a dimensionally stabilizing substrate secured to at least a portion of the pocketed spring assembly core and a scrim sheet secured to at least a portion of the pocketed spring assembly core. The pocketed spring assembly core comprises a plurality of parallel strings of springs joined together. Each string is joined to an adjacent string. The strings may extend longitudinally from side-to-side or transversely from end-to-end or head-to-foot. Each of the strings comprises a plurality of interconnected pockets. Each of the pockets contains at least one spring encased in fabric. The fabric is joined to itself along a longitudinal seam and has first and second opposed plies of fabric on opposite sides of the springs. The fabric of the first and second plies is joined by transverse seams.

A dimensionally stabilizing substrate is secured to at least some of the strings. In most situations, the dimensionally stabilizing substrate is secured directly to at least some of the strings. The dimensionally stabilizing substrate is laterally rigid enough to eliminate length and width elasticity of the coil spring assembly yet remain flexible in the direction of the height of the pocketed spring assembly to allow the pocketed spring assembly to be roll packed.

A scrim sheet may be secured to one of the upper and lower surfaces of the strings of the pocketed spring assembly core to facilitate handling of the pocketed spring assembly.

In another aspect, a method of making a pocketed spring assembly for a bedding or seating product is provided. The method comprises joining a plurality of parallel strings of springs together to form a pocketed spring assembly core. The method further comprises gluing a dimensionally stabilizing substrate to at least some of the strings. The dimensionally stabilizing substrate is laterally rigid enough to eliminate length and width elasticity of the coil spring assembly yet remain flexible in the direction of the height of the pocketed spring assembly to allow the pocketed spring assembly to be roll packed. The method further comprises gluing a scrim sheet to at least some of the strings. The final method step comprises roll packing the pocketed spring assembly having a pocketed spring assembly core, one scrim sheet and one dimensionally stabilizing substrate secured to the pocketed spring assembly core.

In another aspect, a method of making a pocketed spring assembly comprises joining a plurality of parallel strings of springs together to form a pocketed spring assembly core. The method further comprises gluing a dimensionally stabilizing substrate to at least some of the strings. The dimensionally stabilizing substrate is laterally rigid enough to eliminate length and width elasticity of the coil spring assembly yet remain flexible in the direction of the height of the pocketed spring assembly to allow the pocketed spring assembly to be roll packed. The method further comprises gluing a scrim sheet to at least some of the strings. The final method step comprises roll packing the pocketed spring assembly having a pocketed spring assembly core, one scrim sheet and one dimensionally stabilizing substrate secured to the pocketed spring assembly core.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
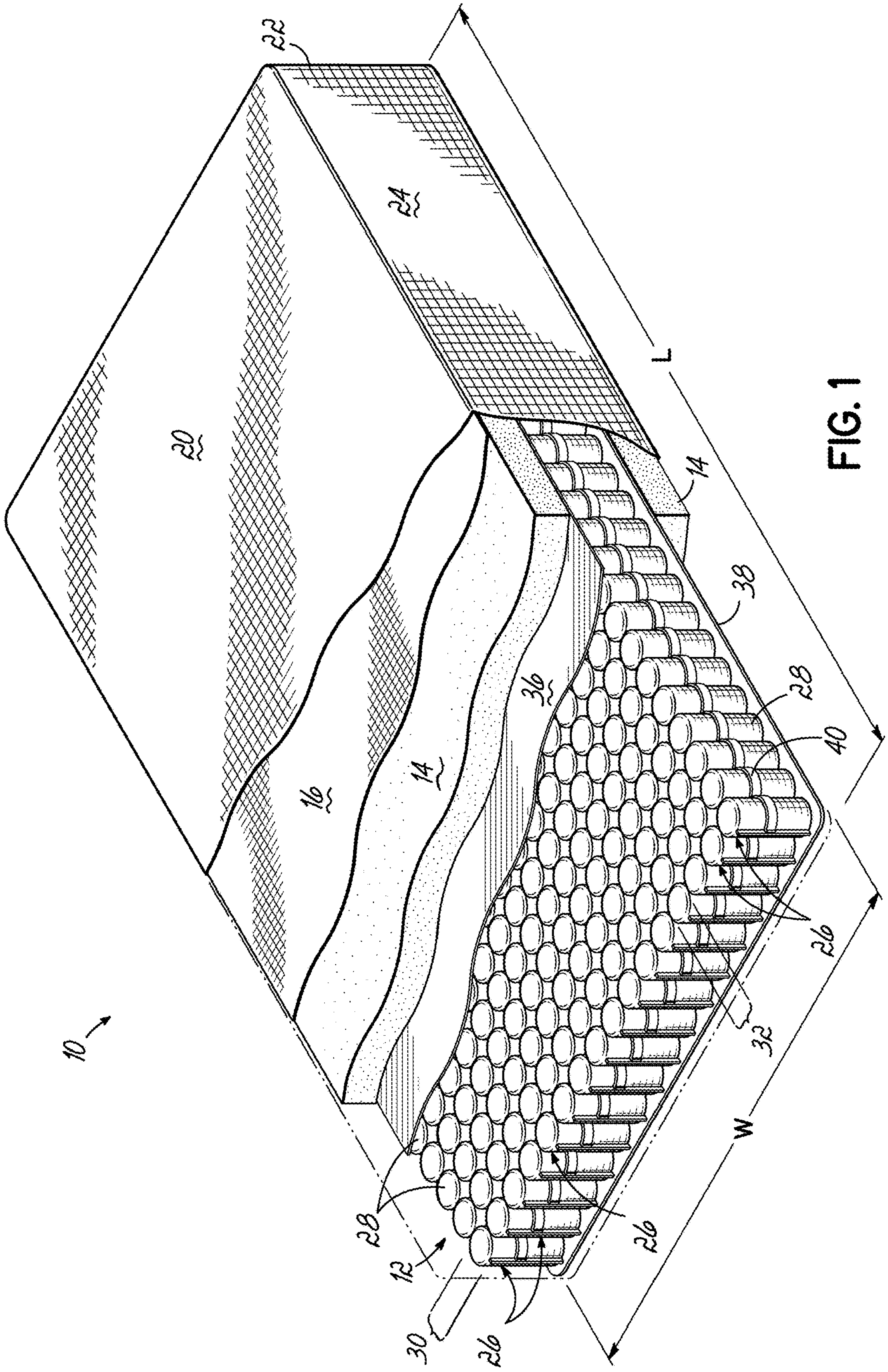
FIG. 1 is a perspective view, partially broken away, of a bedding or seating product incorporating a pocketed spring assembly according to the principles of the present invention.

FIG. 1 illustrates a bedding product in the form of a double-sided mattress 10 incorporating the principles of the present invention. This product or mattress 10 comprises a pocketed spring assembly 12 over the top of which lays conventional padding or cushioning layers 14, 16 which may be foam, fiber, gel, a pocketed spring blanket or any other suitable materials or any combination thereof. Similarly, conventional padding or cushioning layers 14, 16 lie below the pocketed spring assembly 12. An upholstered cover 20 surrounds the pocketed spring assembly 12 and conventional padding or cushioning layers 14, 16.

If desired, any of the padding or cushioning layers may be omitted in any of the embodiments shown or described herein. The novel features reside in the pocketed spring assembly.

As shown in FIG. 1, fully assembled, the product 10 has a length "L" defined as the linear distance between opposed end surfaces 22 (only one being shown in FIG. 1). Similarly, the assembled product 10 has a width "W" defined as the linear distance between opposed side surfaces 24 (only one being shown in FIG. 1). In the product shown in FIG. 1, the length is illustrated as being greater than the width. However, it is within the scope of the present invention that the length and width may be identical, as in a square product.

Figure 2:
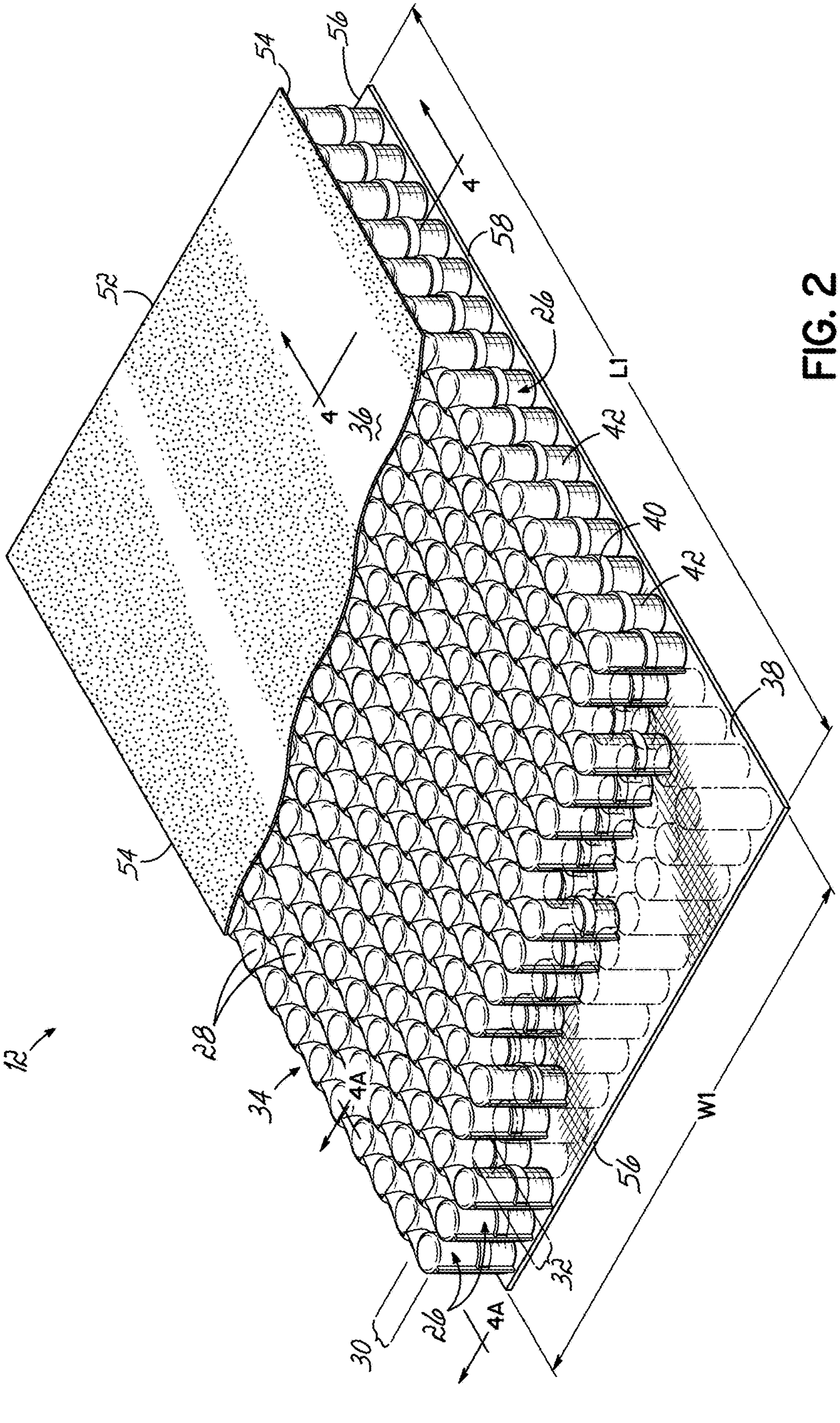
FIG. 2 is a perspective view, partially broken away, of the pocketed spring assembly of the mattress of FIG. 1.
Figure 3:
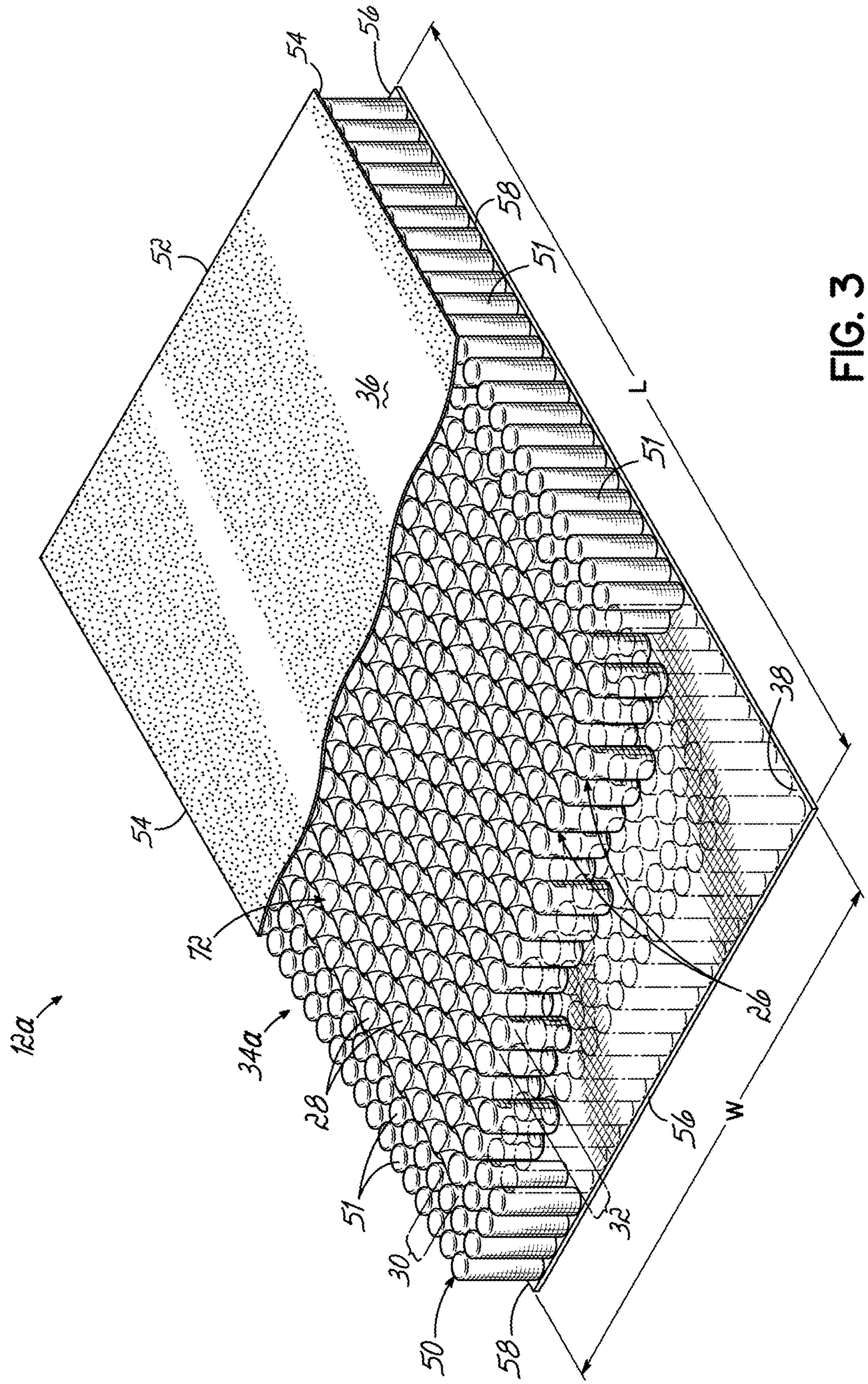
FIG. 3 is a perspective view, partially broken away, of a bedding or seating product incorporating another pocketed spring assembly according to the principles of the present invention.
Figure 4:
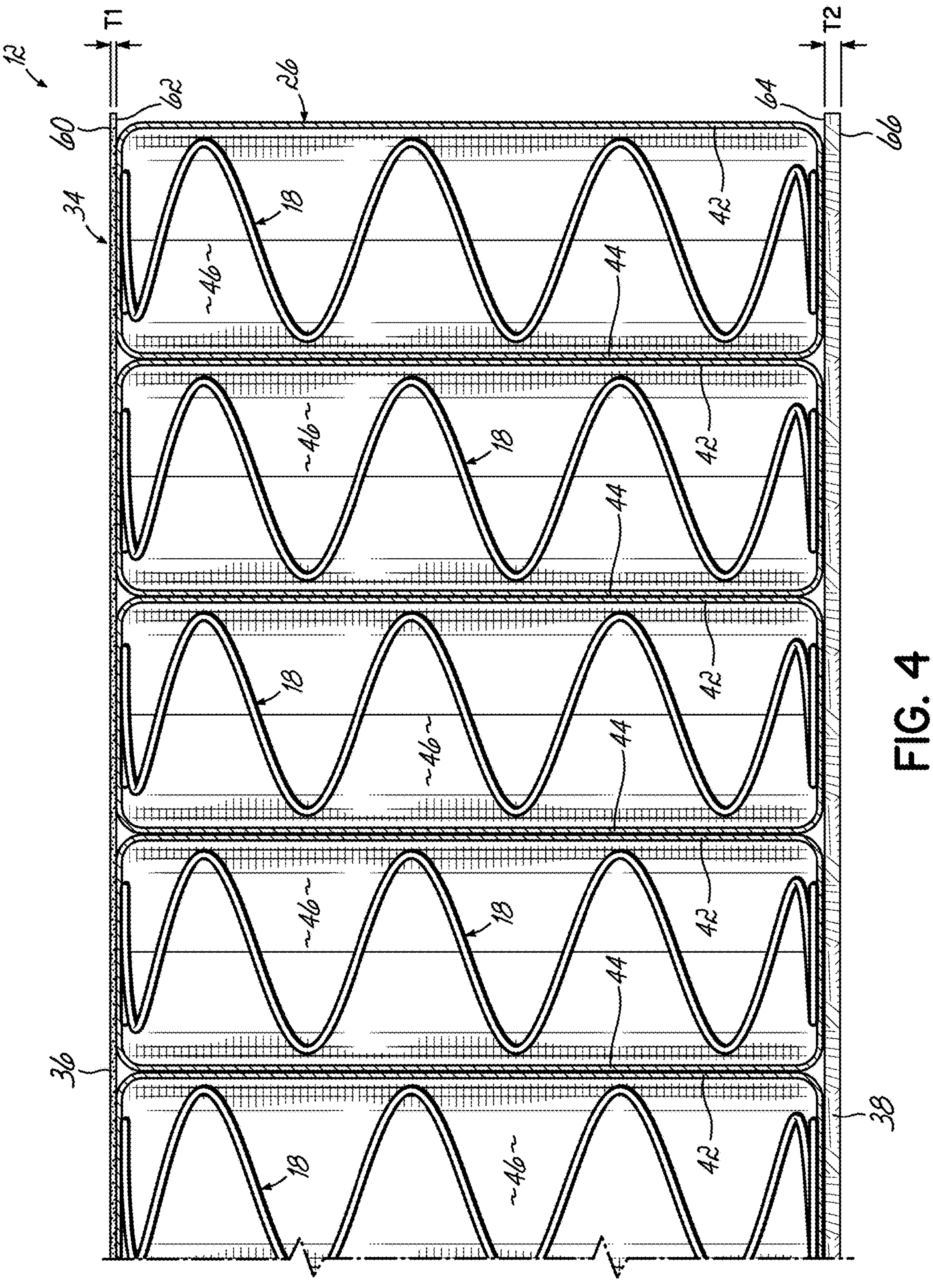
FIG. 4 is a cross-sectional view, partially broken away, taken along the line 4-4 of FIG. 2.

As shown in FIGS. 1 and 2, pocketed spring assembly 12 comprises a pocketed spring assembly core 34, a scrim sheet 36 and a dimensionally stabilizing substrate 38. The pocketed spring assembly core 34 is manufactured from multiple strings 26 of pocketed springs 28 joined together in any known manner, such as by gluing for example. Although pocketed springs 28 are typically metal coil springs 18 (as shown in FIG. 4), the springs may be any resilient members including foam, for example. Although the strings 26 of pocketed springs 28 are commonly arranged in transversely extending rows 30 and longitudinally extending columns 32, as shown in FIGS. 1 and 2, they may be offset, as is known in the art. The present invention is not intended to limit the configuration or type of pocketed spring assembly core 34 to those illustrated. FIG. 3 illustrates an alternative pocketed spring assembly core 34*a*, as one example.

As best shown in FIG. 2, each string 26 extends longitudinally or from head-to-foot along the full length of the pocketed spring assembly core 34. Although the strings 26 are illustrated as extending longitudinally or from head-to-foot in the pocketed spring assembly 12 of FIGS. 1 and 2, they may extend transversely or from side-to-side as is known in the art. In any of the embodiments shown or described herein, the strings may extend either longitudinally (from end-to-end) or transversely (from side-to-side).

Figure 4A:
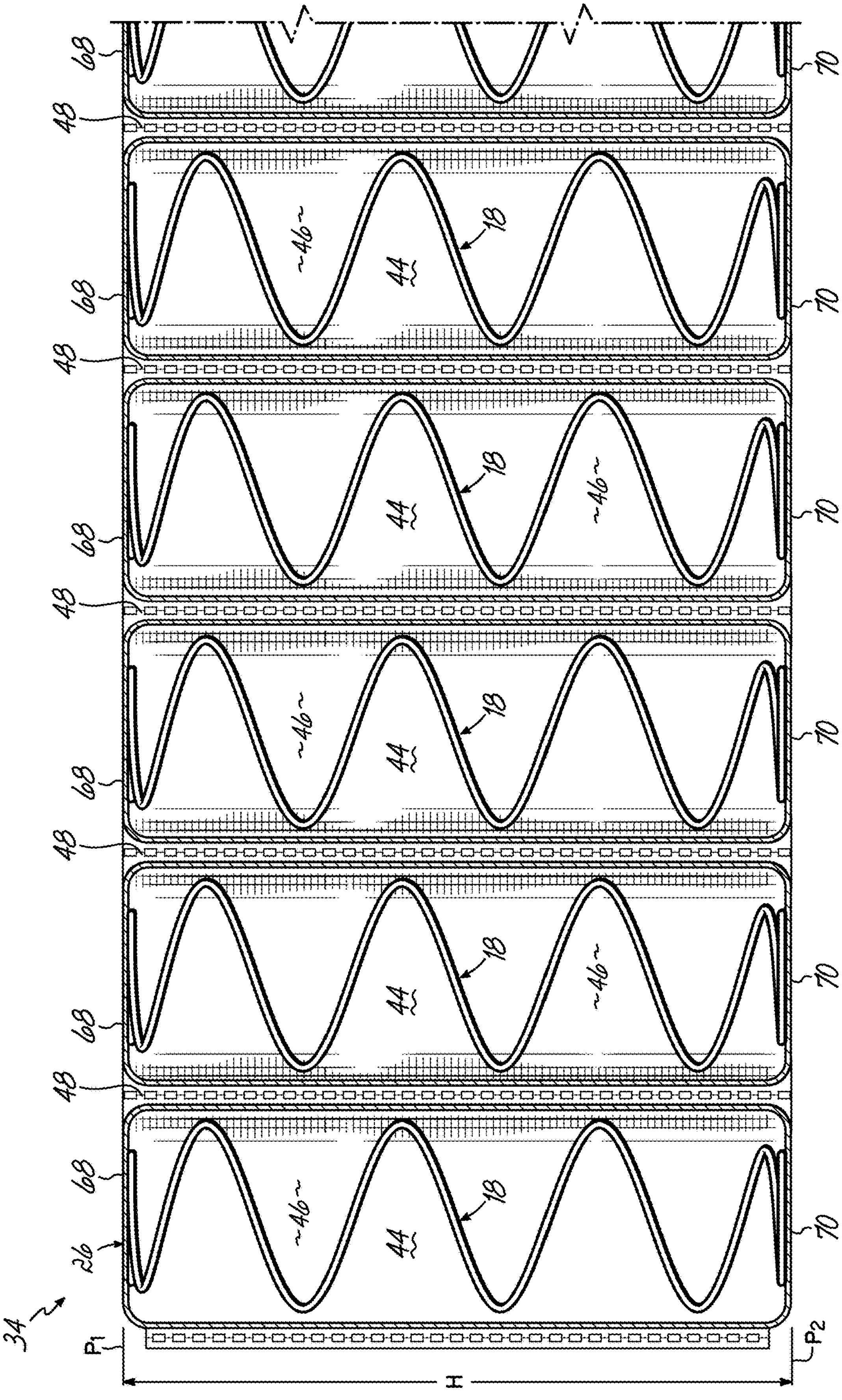
FIG. 4A is a cross-sectional view, partially broken away, taken along the line 4A-4A of FIG. 2.

As best shown in FIGS. 4 and 4A, each string 26 of pocketed spring assembly core 34 comprises a piece of fabric joined along a longitudinal seam 40 shown in FIG. 1, first and second opposed plies of fabric 42, 44 being on opposite sides of the springs 18, a plurality of pockets 46 being formed along a length of said string 26 by transverse seams 48 joining said first and second plies, at least one spring 18 being positioned in each pocket 46. Although one type of spring 18 is shown, any spring may be incorporated into any of the pockets 46.

As best shown in FIG. 4A, each string 26 of pocketed spring assembly core 34 has an upper surface 68 and a lower surface 70. As best shown in FIG. 4A, the upper surfaces 68 of the strings 26 of pocketed spring assembly core 34 are generally co-planar in an upper plane P1 and the lower surfaces 70 of the strings 26 of pocketed spring assembly core 34 are generally co-planar in a lower plane P2. The linear distance between upper and lower surfaces 68, 70 of the strings 26 of pocketed spring assembly core 34 is defined as the height "H" of the pocketed spring assembly core 34 because all the strings 26 are the same height.

As best shown in FIG. 4, scrim sheet 36 is secured to an upper surface 68 of at least some of the strings 26 of pocketed spring assembly core 34 with adhesive/glue. Similarly, dimensionally stabilizing substrate 38 is secured to the lower surface 70 of at least some of the strings 26 of pocketed spring assembly core 34 with adhesive. Although not shown, the dimensionally stabilizing substrate 38 may be secured to the upper surface 68 of at least some of the strings 26 of pocketed spring assembly core 34 with adhesive and the scrim sheet 36 secured to the lower surface 70 of at least some of the strings 26 of pocketed spring assembly core 34 with adhesive. In some applications, the scrim sheet may be omitted.

As best shown in FIG. 2, scrim sheet 36 has a length "L1" defined as the linear distance between opposed end edges 52 (only one being shown in FIG. 2). Similarly, the scrim sheet 36 has a width "W1" defined as the linear distance between opposed side edges 54. In the pocketed spring assembly 12 shown in FIG. 2, the length is illustrated as being greater than the width. However, it is within the scope of the present invention that the length and width may be identical, as in a square pocketed spring assembly. As shown in FIG. 4, the scrim sheet 36 has a thickness "T1" defined as the linear distance between opposed top and bottom surfaces 60, 62, respectively. In one embodiment, the thickness T1 of the scrim sheet 36 is 0.009 inches, but may be any desired thickness. Scrim sheet 36 is preferably made of a non-woven polypropylene fabric which is commonly the material from which the strings 26 of pocketed spring assembly core 34 are made.

Figure 6A:
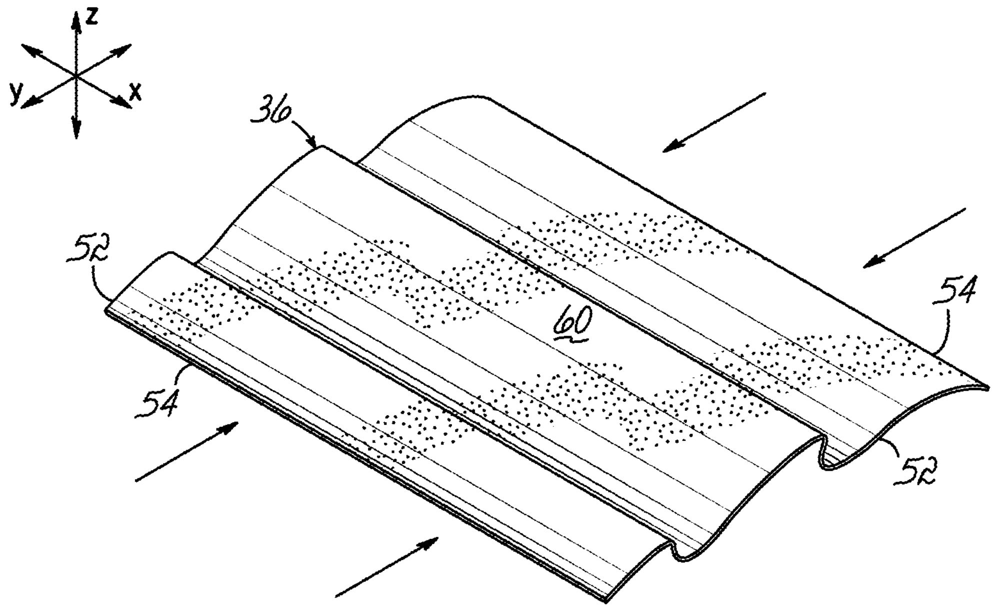
FIG. 6A is a perspective view of a scrim sheet being compressed in the direction of the Y-axis.
Figure 6B:
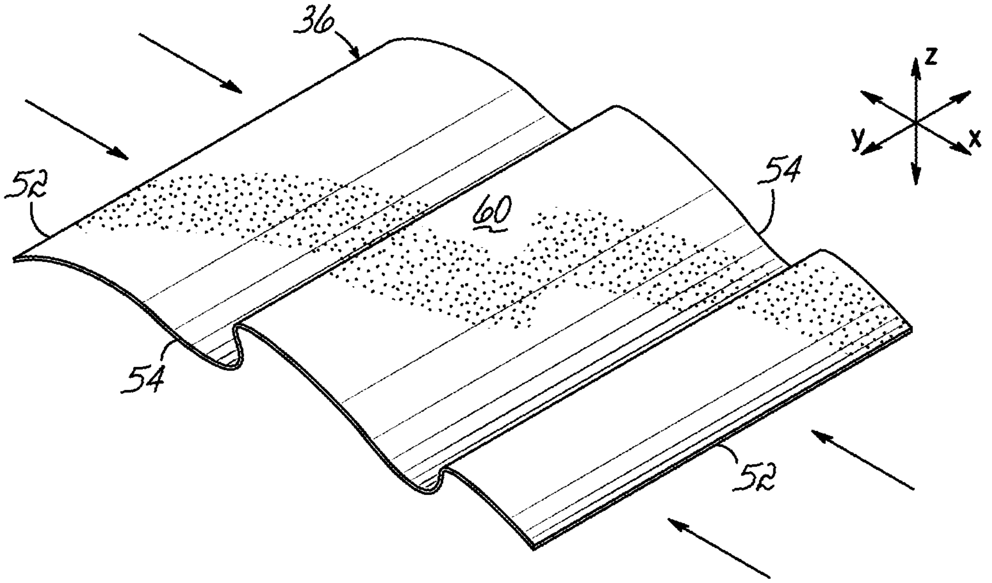
FIG. 6B is a perspective view of a scrim sheet being compressed in the direction of the X-axis.

As best shown in FIGS. 6A and 6B, scrim sheet 36 is elastic or flexible in the directions of the X axis, Y axis and Z axis. On the other hand, as best shown in FIGS. 6A and 6B, dimensionally stabilizing substrate 38 is elastic or flexible in the direction of the Z axis only.

Referring to FIG. 6A, when a compressive force is exerted on the scrim sheet 36 in the direction of the Y axis, as illustrated by the arrows in FIG. 6A, the scrim sheet 36 bunches upwardly and forms an irregular pattern. In other words, the scrim sheet 36 is easily shortened in the direction of the Y axis when subject to a compressive force in the direction of the Y axis.

Referring to FIG. 6B, when a compressive force is exerted on the scrim sheet 36 in the direction of the X axis, as illustrated by the arrows in FIG. 6B, the scrim sheet 36 bunches upwardly and forms an irregular pattern. In other words, the scrim sheet 36 is easily shortened in the direction of the X axis when subject to a compressive force in the direction of the X axis.

Similarly, as best shown in FIG. 2, dimensionally stabilizing substrate 38 has a length "L1" defined as the linear distance between opposed end edges 56. Similarly, the dimensionally stabilizing substrate 38 has a width "W1" defined as the linear distance between opposed side edges 58 (only one being shown in FIG. 2). In the pocketed spring assembly 12 shown in FIG. 2, the length is illustrated as being greater than the width. However, it is within the scope of the present invention that the length and width may be identical, as in a square pocketed spring assembly. As shown in FIG. 4, the dimensionally stabilizing substrate 38 has a thickness "T2" defined as the linear distance between opposed top and bottom surfaces 64, 66, respectively. In one embodiment, the thickness T2 of the dimensionally stabilizing substrate 38 is 0.032 inches, but may be any desired thickness.

Figure 5A:
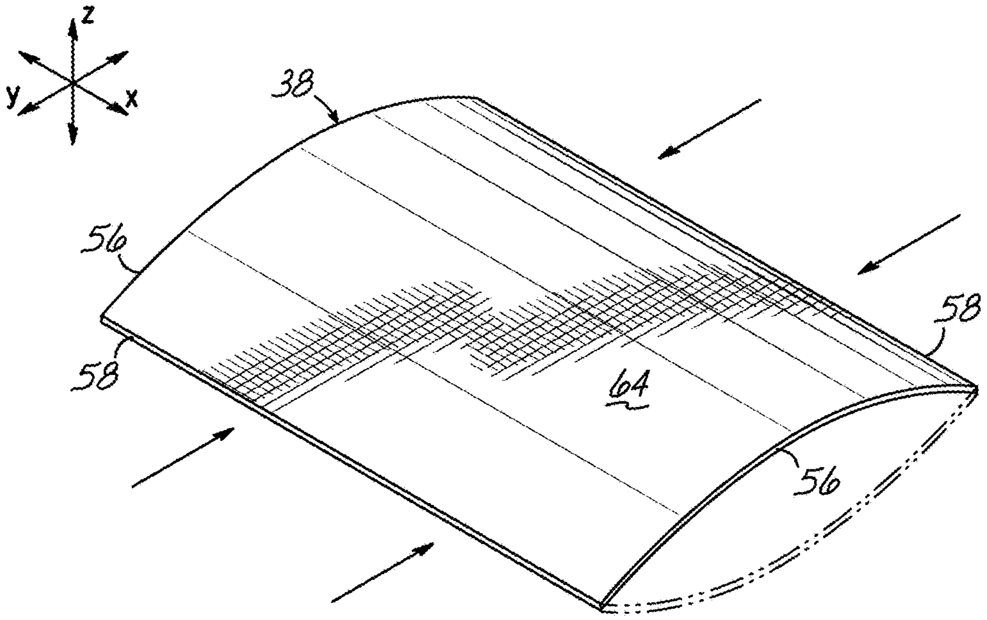
FIG. 5A is a perspective view of a dimensionally stabilizing substrate being compressed in the direction of the Y-axis.

Referring to FIG. 5A, when a compressive force is exerted on the dimensionally stabilizing substrate 38 in the direction of the Y axis, as illustrated by the arrows in FIG. 5A, the dimensionally stabilizing substrate 38 bows either upwardly as shown in solid lines or downwardly as shown in dashed lines in the direction of the Z axis. The dimensionally stabilizing substrate 38 does not bunch upwardly and form an irregular pattern as the scrim sheet 36 does when subjected to the same force as shown in FIG. 6A. In other words, the dimensionally stabilizing substrate 38 resists being shortened in the direction of the Y axis when subject to a compressive force in the direction of the Y axis.

Figure 5B:
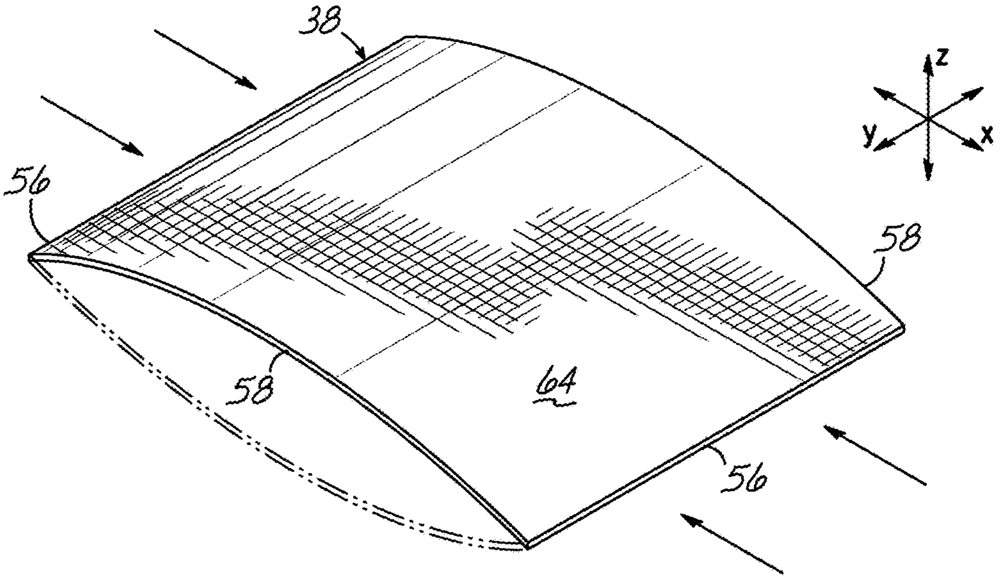
FIG. 5B is a perspective view of a dimensionally stabilizing substrate being compressed in the direction of the X-axis.

Referring to FIG. 5B, when a compressive force is exerted on the dimensionally stabilizing substrate 38 in the direction of the X axis, as illustrated by the arrows in FIG. 5B, the dimensionally stabilizing substrate 38 bows either upwardly as shown in solid lines (or downwardly as shown in dashed lines) in the direction of the Z axis. The dimensionally stabilizing substrate 38 does not bunch upwardly and form an irregular pattern as the scrim sheet 36 does when subjected to the same force as shown in FIG. 6B. In other words, the dimensionally stabilizing substrate 38 resists being shortened in the direction of the X axis when subject to a compressive force in the direction of the X axis.

One material which has proven effective for the dimensionally stabilizing substrate 38 is a continuous filament, needled polyester with a resin binder with a weight of at least two ounces per square yard. The resin may be corn starch. A weight of at least 3.5 ounces per square yard has proven to perform well. This material may be purchased from Hanes Companies of Conover, North Carolina, a division of Leggett & Platt, Incorporated.

FIG. 3 illustrates an alternative pocketed spring assembly 12*a* having a different pocketed spring assembly core 34*a*. The pocketed spring assembly core 34*a* includes a border 50 made of pocketed coil springs 51 (only a portion being shown in FIG. 3). The border 50 surrounds a central portion 72 (only a portion being shown in FIG. 3) comprising strings 26 of individually pocketed springs 28, as described herein. The pocketed springs 51 of border 50 are narrower than the pocketed springs 28 of the central portion 72 of pocketed spring assembly core 34*a*. Although one type of border 50 is illustrated, the border may assume other forms or shapes of pocketed coil springs. Alternatively, the border 50 may be omitted in this embodiment or any embodiment described or shown herein.

Strings of pocketed springs 26 and any other strings of springs described or shown herein, may be connected in side-by-side relationship as, for example, by gluing the sides of the strings together in an assembly machine, to create an assembly or matrix of springs having multiple rows and columns of pocketed springs bound together as by gluing, welding or any other conventional assembly process commonly used to create pocketed spring cores or assemblies.

Figure 7:
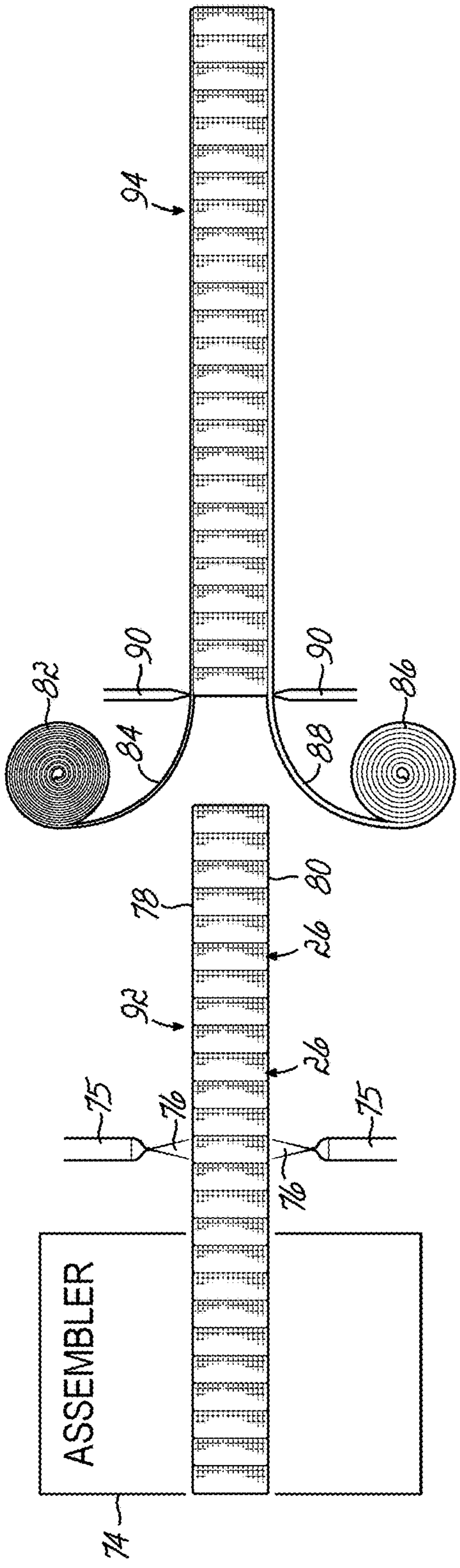
FIG. 7 is a side elevational view of a method of making a pocketed spring assembly in accordance with the present invention.
Figure 8:
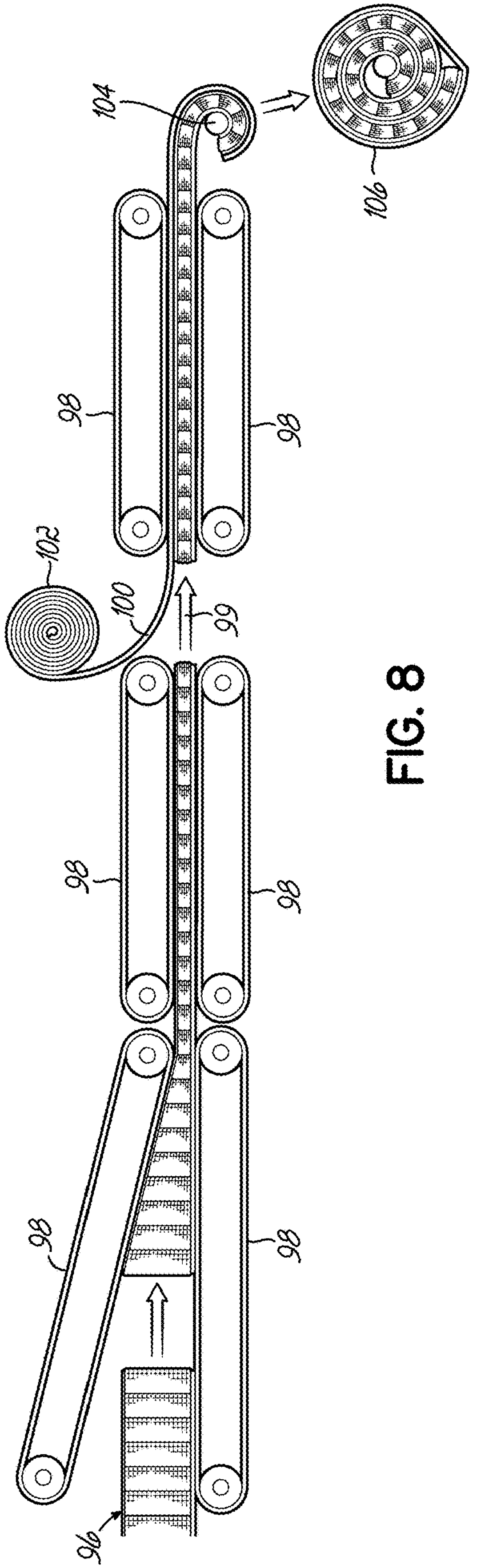
FIG. 8 is side elevational view of a method of roll packing multiple pocketed spring assemblies in accordance with the present invention.

FIGS. 7 and 8 illustrate a method of making the pocketed spring assembly in accordance with the present invention. Referring to FIG. 7, in an assembler 74 strings 26 of individually pocketed springs 28 are glued together to form a continuous pocketed spring web 92. Nozzles 75 apply adhesive/glue 76 to top and bottom surfaces 78, 80 of the pocketed spring web 92 as the pocketed spring web 92 is moving downstream (to the right in FIG. 7). A roll 82 comprising a web 84 of non-woven polypropylene fabric or scrim material is unwound and placed upon the top surface 78 of the pocketed spring web 92 as the pocketed spring web 92 is moving downstream (to the right in FIG. 7). Similarly, a roll 86 comprising a web 88 of dimensionally stabilizing substrate material is unwound and placed upon the bottom surface 80 of the pocketed spring web 92 as the pocketed spring web 92 is moving downstream (to the right in FIG. 7). The combination of the web 84 of non-woven polypropylene fabric or scrim material, the pocketed spring web 92 and the web 88 of dimensionally stabilizing substrate material secured together will be called a continuous finished web 94 for purposes of this document.

As shown in FIG. 7, blades 90 move to cut the continuous finished web 94 to a desired size to form a pocketed spring assembly 96. Although two blades 90 are shown, any number of blades including only one blade may be used.

As shown in FIG. 8, pocketed spring assembly 96 is moved further downstream between two conveyor belts 98 to compress the pocketed spring assembly 96 for roll packing. The compressed pocketed spring assembly 96 is moved further downstream as indicated by the arrow 99 shown in FIG. 8. A web 100 of packaging material stored on a roll 102 is laid on the compressed pocketed spring assembly 96 and then rolled around a tube 104 into a roll-pack 106 for shipment.

Figures 9, 10, 11, 12:
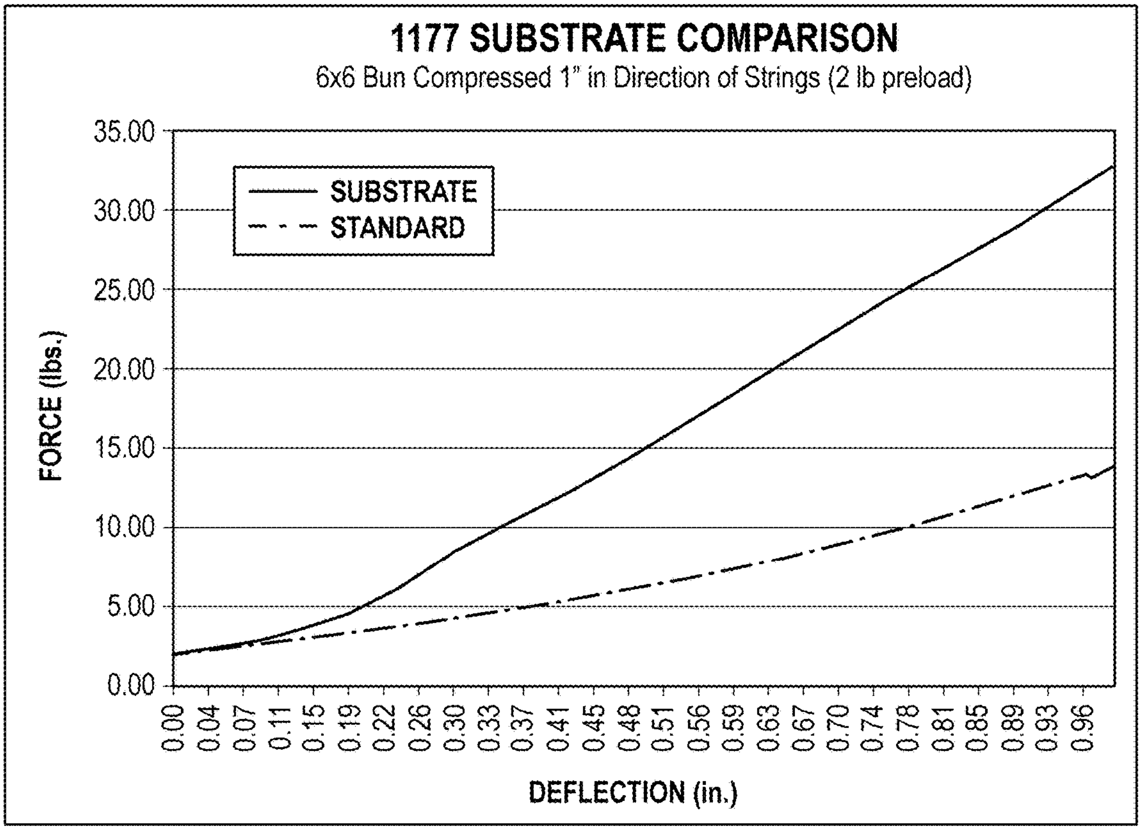
FIG. 9 is a chart of data from a first test comparing a standard pocketed spring assembly having two scrim sheets to a pocketed spring assembly having one scrim sheet and one a dimensionally stabilizing substrate.
FIG. 10 is a graph of data from another test comparing a standard pocketed spring assembly having two scrim sheets to a pocketed spring assembly having one scrim sheet and one a dimensionally stabilizing substrate.
FIG. 11 is a chart of data from another test comparing a standard pocketed spring assembly having two scrim sheets to a pocketed spring assembly having one scrim sheet and one a dimensionally stabilizing substrate.
FIG. 12 is a chart of data from another test comparing a standard pocketed spring assembly having two scrim sheets to a pocketed spring assembly having one scrim sheet and one a dimensionally stabilizing substrate.
Figure 9A:
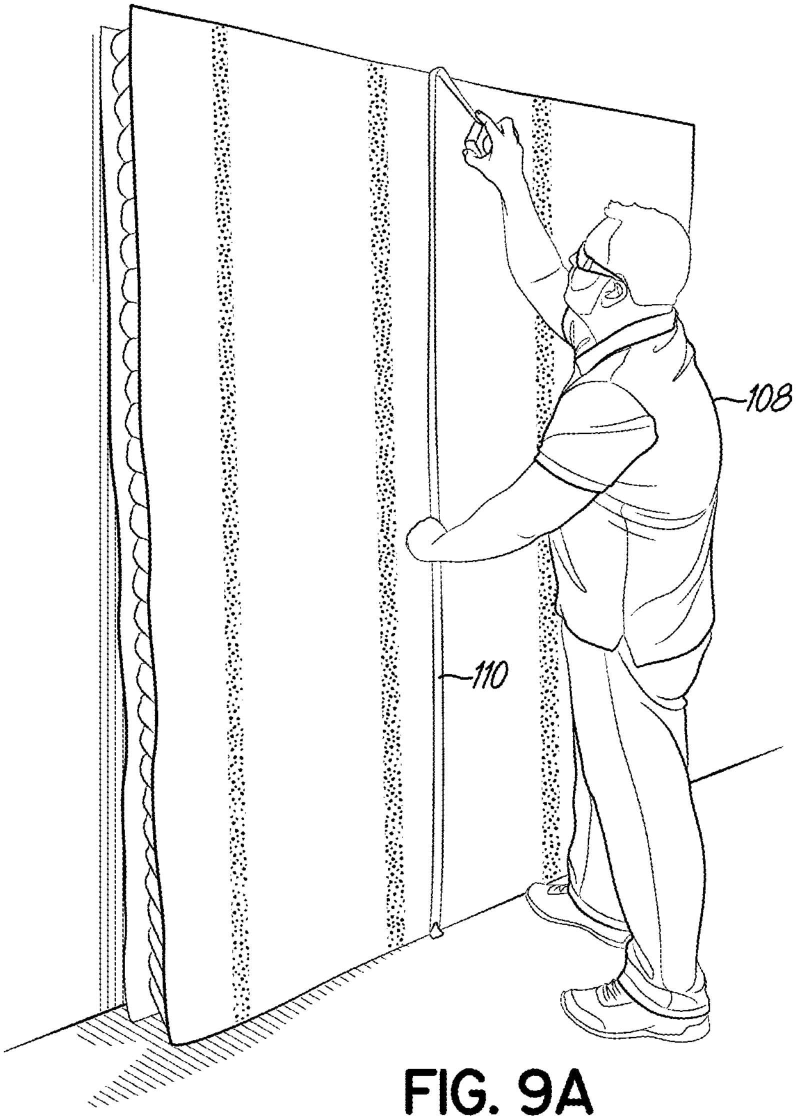
FIG. 9A is a perspective view of a person measuring a queen size pocketed spring assembly which resulted in the data shown in FIG. 9.

FIG. 9 illustrates the results of a test in which two queen size pocketed spring assemblies were compared. FIG. 9A illustrates how the test was performed. One pocketed spring assembly labelled "Standard" had dimensions in the X and Y axis directions of 79 inches by 56 inches before two scrim sheets of non-woven polypropylene fabric having a density of one ounce per square yard were attached to the top and bottom surfaces, respectively, of the pocketed spring assembly. A second pocketed spring assembly labelled "Substrate" had dimensions in the X and Y axis directions of 79 inches by 56 inches before one scrim sheet of non-woven polypropylene fabric having a density of one ounce per square yard was attached to one the top and bottom surfaces of the pocketed spring assembly and a dimensionally stabilizing substrate was attached to the other of the top and bottom surfaces of the pocketed spring assembly. Each unit was placed in the same position shown in FIG. 9A with each spring axis being horizontally oriented and the scrim sheet(s) generally vertically oriented. The strings extending from head to foot extended generally vertically when the units were measured. The data shown in FIG. 9 shows the pocketed spring assembly with the dimensionally stabilizing substrate was taller compared to the "Standard" unit without any load applied. FIG. 9A shows a person 108 using a tape measure 110 to obtain the data shown in FIG. 9.

FIG. 10 illustrates the results a test in which two mini-samples of pocketed spring assemblies were compared, each mini-sample comprising six strings, each string having six pocketed coil springs. Each barrel-shaped coil spring was eight inches tall with five convolutions and a maximum diameter of 77 millimeters. The mini-sample labelled "Standard" had two scrim sheets of non-woven polypropylene fabric having a density of one ounce per square yard attached to the top and bottom surfaces, respectively, of the mini-sample. A mini-sample labelled "Substrate" had one scrim sheet of non-woven polypropylene fabric having a density of one ounce per square yard attached to one the top and bottom surfaces of the mini-sample and a dimensionally stabilizing substrate was attached to the other of the top and bottom surfaces of the mini-sample. The mini-samples were put into an Admet testing machine. The chart shown in FIG. 10 shows a greater force was required to deflect the "Substrate" mini-sample a predetermined distance.

Figure 11A:
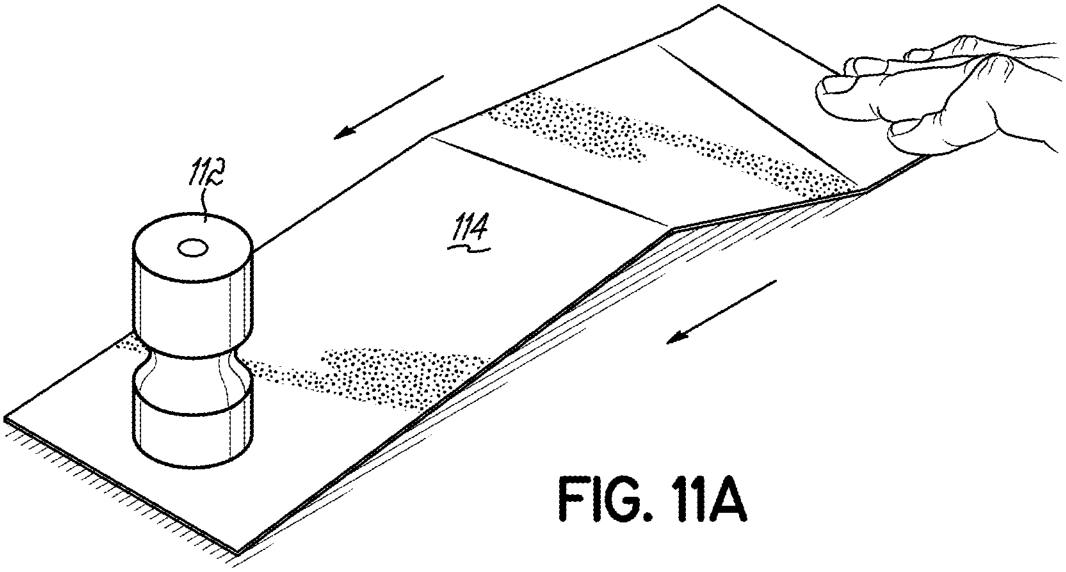
FIG. 11A is a perspective view illustrating how the data shown in FIG. 11 was obtained.

FIG. 11 illustrates the results a test in which 12 inch by 4 inch pieces of material were pushed along a flat surface with incrementally increasing weights placed on one end of the piece of material. FIG. 11A illustrates how the test was performed. The weight 112 shown in FIG. 11A and listed in the chart of FIG. 11 is the weight at which the piece of material 114 shown in FIG. 11A buckled during the test. The piece of material labelled "Standard" was made of non-woven polypropylene fabric having a density of one ounce per square yard. The piece of material labelled "Substrate" was a dimensionally stabilizing substrate material having a density of four ounces per square yard. As the chart shows, much more weight was required to make the dimensionally stabilizing substrate material buckle.

Figure 12A:
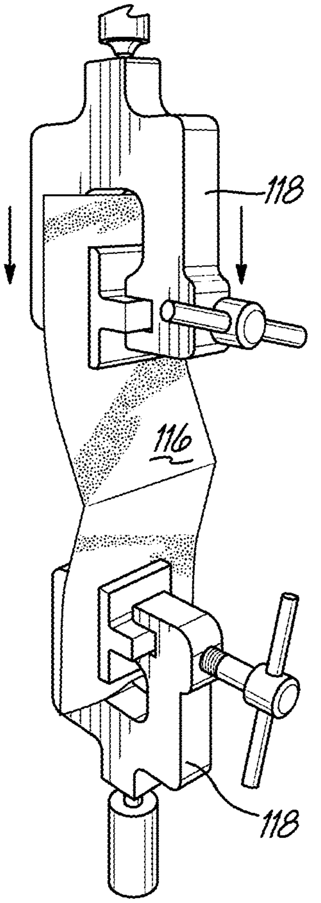
FIG. 12A is a perspective view illustrating how the data shown in FIG. 12 was obtained.

FIG. 12 illustrates the results a test in which 12 inch by 4 inch pieces of material were compressed using an Admet testing machine having two clamps 118 shown in FIG. 12A. FIG. 12A illustrates how the test was performed. The force listed in the chart of FIG. 12 is the weight at which the piece of material 116 buckled during the test. The piece of material labelled "Standard" was made of non-woven polypropylene fabric having a density of one ounce per square yard. The piece of material labelled "Substrate" was a dimensionally stabilizing substrate material having a density of four ounces per square yard. As the chart shows, much more weight was required to make the dimensionally stabilizing substrate material buckle.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. A bedding or seating product comprising:

a pocketed spring assembly comprising a plurality of parallel strings of springs joined together to form a pocketed spring assembly core;

a dimensionally stabilizing substrate secured to one of top and bottom surfaces of the pocketed spring assembly core to create a pocketed spring assembly;

a scrim sheet secured to the other of the top and bottom surfaces of said at least some of the strings of the pocketed spring assembly, wherein said dimensionally stabilizing substrate is thicker and more rigid than the scrim sheet, the dimensionally stabilizing substrate being flexible enough in the height of the pocketed spring assembly to allow the pocketed spring assembly to be roll packed, cushioning materials; and an upholstered covering encasing said pocketed spring assembly and cushioning materials.

2. A bedding or seating product comprising:

a pocketed spring assembly comprising a plurality of parallel strings of springs joined together to form a pocketed spring assembly core;

a dimensionally stabilizing substrate secured to one of top and bottom surfaces of the pocketed spring assembly core to create a pocketed spring assembly; and a scrim sheet secured to the other of the top and bottom surfaces of the pocketed spring assembly core;

wherein said dimensionally stabilizing substrate is thicker and more rigid than the scrim sheet, the dimensionally stabilizing substrate being flexible enough in the height of the pocketed spring assembly to allow the pocketed spring assembly to be roll packed.

3. The product of claim 2 wherein said scrim sheet is made of a non-woven polypropylene fabric.

4. The product of claim 2 wherein said scrim sheet is flexible in the X, Y and Z axis directions.

5. The product of claim 2 wherein the dimensionally stabilizing substrate resists being shorted in the Y axis direction when subject to a compressive force in the direction of the Y axis.

6. The product of claim 2 wherein the scrim sheet and the fabric of the strings of springs are both made of non-woven polypropylene fabric.

7. The product of claim 6 wherein the scrim sheet is made of a non-woven polypropylene fabric.

8. The product of claim 2 wherein the dimensionally stabilizing substrate comprising a sheet having a density of at least 3.4 ounces per square yard.

9. The product of claim 2 wherein some of the individually pocketed springs are different than other individually pocketed springs of the pocketed spring assembly.

10. A pocketed spring assembly comprising:

a pocketed spring assembly core comprising parallel strings of springs joined together, each of said strings comprising a plurality of individually pocketed springs, each of said strings comprising a piece of fabric joined along a longitudinal seam, first and second opposed plies of fabric being on opposite sides of the springs, a plurality of pockets being formed along a length of said string by transverse seams joining said first and second plies, at least one spring being positioned in each said pocket;

a dimensionally stabilizing substrate being secured to a portion of pocketed spring assembly core with adhesive; and a scrim sheet secured to another portion of the pocketed spring assembly core with adhesive to facilitate handling of the pocketed spring assembly, the dimensionally stabilizing substrate being thicker and more rigid than the scrim sheet, but bendable for purposes of roll packing the pocketed spring assembly.

11. The pocketed spring assembly of claim 10 wherein said dimensionally stabilizing substrate is flexible in the direction of the Z axis only.

12. The pocketed spring assembly of claim 10 wherein the scrim sheet and the fabric of the strings of springs are both made of non-woven polypropylene fabric.

13. The pocketed spring assembly of claim 10 wherein the scrim sheet is made of a non-woven polypropylene fabric.

14. The pocketed spring assembly of claim 10 wherein said springs are coil springs.

15. A pocketed spring assembly having a length, width and height, said pocketed spring assembly comprising:

a plurality of parallel strings of springs joined together, each of said strings comprising a plurality of individually pocketed springs, each of said strings comprising a piece of fabric joined along a longitudinal seam, first and second opposed plies of fabric being on opposite sides of the springs, a plurality of pockets being formed along a length of said string by transverse seams joining said first and second plies, at least one spring being positioned in each said pocket;

a dimensionally stabilizing substrate secured directly to either a top surface or a bottom surface of at least some of the strings;

a scrim sheet secured directly to the other surface of the top and bottom surfaces of said at least some of the strings, wherein said dimensionally stabilizing substrate is thicker than the scrim sheet.

16. The pocketed spring assembly of claim 15 wherein the dimensionally stabilizing substrate is made from polyester.

17. The pocketed spring assembly of claim 16 wherein said dimensionally stabilizing substrate is at least twice as thick as the scrim sheet.

18. The pocketed spring assembly of claim 15 wherein said dimensionally stabilizing substrate has a weight of 2.0 ounces per square yard.

19. The pocketed spring assembly of claim 15 wherein the scrim sheet is flexible in the direction of the length and width of the coil spring assembly.

20. The pocketed spring assembly of claim 15 wherein the scrim sheet and the fabric of the strings of springs are both made of non-woven polypropylene fabric.

* * * * *